US012172748B2

(12) United States Patent
Cozens et al.

(10) Patent No.: US 12,172,748 B2
(45) Date of Patent: Dec. 24, 2024

(54) AIRCRAFT SYSTEM

(71) Applicants: AIRBUS OPERATIONS LIMITED, Bristol (GB); AIRBUS OPERATIONS (S.A.S.), Toulouse (FR)

(72) Inventors: Simon John Cozens, Bristol (GB); Fernando Izquierdo Civera, Bristol (GB); Nicholas Elliott, Bristol (GB); Daren Payne, Bristol (GB); Livier Ben, Bristol (GB); Julien Decronsonniere, Bristol (GB); James Cullingham, Bristol (GB)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 275 days.

(21) Appl. No.: 17/681,539

(22) Filed: Feb. 25, 2022

(65) Prior Publication Data

US 2022/0274689 A1 Sep. 1, 2022

(30) Foreign Application Priority Data

Feb. 26, 2021 (GB) ...................................... 2102830

(51) Int. Cl.
*B64C 25/00* (2006.01)
(52) U.S. Cl.
CPC .................................. *B64C 25/00* (2013.01)
(58) Field of Classification Search
CPC ......... B64C 13/16; B64C 25/00; B64C 25/10; B64C 25/26; B64C 25/30
See application file for complete search history.

(56) References Cited

U.S. PATENT DOCUMENTS

| 6,854,689 | B1 | 2/2005 | Lindahl et al. |
| 6,880,784 | B1 * | 4/2005 | Wilkinson ........... G05D 1/0661 244/76 R |
| 9,164,505 | B1 * | 10/2015 | Peck ....................... B60T 8/885 |
| 9,517,837 | B2 | 12/2016 | Lecourtier |
| 10,302,451 | B1 | 5/2019 | Kim et al. |

(Continued)

FOREIGN PATENT DOCUMENTS

| CN | 107226199 A | * | 10/2017 | ........... B64C 1/1407 |
| CN | 112253319 A | * | 1/2021 | ............. F02D 29/02 |

(Continued)

OTHER PUBLICATIONS

English machine translation of CN-107226199-A (Year: 2017).*

(Continued)

*Primary Examiner* — Navid Z. Mehdizadeh
*Assistant Examiner* — Caitlin R McCleary
(74) *Attorney, Agent, or Firm* — Nixon & Vanderhye P.C.

(57) ABSTRACT

An aircraft system for an aircraft is disclosed having a controller that is configured, during a take-off procedure, to initiate, prior to receiving a command to retract a landing gear, automatic opening of a landing gear bay door associated with the landing gear from a closed position towards an open position, on the basis of a determination, made when a speed of the aircraft is determined by the controller to be equal to or greater than a first threshold speed, that a one engine inoperative condition is met.

20 Claims, 4 Drawing Sheets

(56) References Cited

U.S. PATENT DOCUMENTS

| | | | |
|---|---|---|---|
| 2006/0032981 A1* | 2/2006 | Fort | B64C 25/16 |
| | | | 244/129.4 |
| 2011/0066306 A1* | 3/2011 | Berthereau | B64C 13/16 |
| | | | 701/15 |
| 2017/0341772 A1* | 11/2017 | Reis | B64C 13/16 |
| 2019/0106089 A1* | 4/2019 | Pandey | B60T 8/171 |
| 2021/0158709 A1* | 5/2021 | Schwindt | G08G 5/0065 |

FOREIGN PATENT DOCUMENTS

| | | | | |
|---|---|---|---|---|
| EP | 3 725 678 | | 10/2020 | |
| GB | 2563437 | | 12/2018 | |
| GB | 2587205 | | 3/2021 | |
| WO | WO-2005065071 A2 * | 7/2005 | | B64C 17/10 |
| WO | 2019/166461 | | 9/2019 | |

OTHER PUBLICATIONS

English machine translation of CN-112253319-A (Year: 2021).*
UKIPO Search Report for Application No. GB2102830.3 dated Nov. 30, 2021, 5 pages.

* cited by examiner

AIRCRAFT SYSTEM

CROSS RELATED APPLICATION

This application claims priority to United Kingdom Patent Application GB2102830.3, filed Feb. 26, 2021, the entire contents of which is hereby incorporated by reference.

TECHNICAL FIELD

The present invention relates to an aircraft system for an aircraft, to a method of operating a controller of an aircraft system of an aircraft during a take-off procedure, and to an aircraft.

BACKGROUND

In some known aircraft, a landing gear of the aircraft is held in an extended position when the aircraft is on the ground and is retracted to a stowed position once the aircraft has taken off. Movement of the landing gear between the extended position and the stowed position is typically controlled by a pilot using cockpit controls of the aircraft, such as a landing gear lever. In several of these known aircraft, a landing gear bay door, in a closed position, partially or fully covers a landing gear bay in which the landing gear is stored in the stowed position. The landing gear and landing gear bay door cause aircraft drag during a take-off procedure until they reach their respective stowed and closed positions.

SUMMARY

A first aspect of the present invention provides an aircraft system for an aircraft, the aircraft system comprising a controller that is configured, during a take-off procedure, to initiate, prior to receiving a command to retract a landing gear, automatic opening of a landing gear bay door associated with the landing gear from a closed position towards an open position, on the basis of a determination, made when a speed of the aircraft is determined by the controller to be equal to or greater than a first threshold speed, that a one engine inoperative condition is met.

Optionally, the first threshold speed is less than $V_1$ of the aircraft. Optionally, the first threshold speed is equal to $V_1$ of the aircraft.

Optionally, the controller is configured to initiate the automatic opening of the landing gear bay door on the basis of the determination, when the determination occurs when the speed of the aircraft is determined by the controller to be less than or equal to a second threshold speed and inhibit the automatic opening of the landing gear bay door when the determination that the one engine inoperative condition is met occurs when the speed of the aircraft is greater than the second threshold speed.

Optionally, the second threshold speed is greater than $V_1$ of the aircraft.

Optionally, the second threshold speed is determined based on one or more of: a take-off weight of the aircraft, a type of the aircraft, a configuration of the aircraft, thrust generatable by the aircraft, runway topography and environmental conditions.

Optionally, the second threshold speed is less than a lift-off speed of the aircraft.

Optionally, the controller is configured such that the automatic opening of the landing gear bay door is initiated only when the determination that the one engine inoperative condition is met occurs when the speed of the aircraft is equal to or greater than the first threshold speed.

Optionally, the controller is configured such that the automatic opening of the landing gear bay door is initiated only when the determination that the one engine inoperative condition is met occurs when the speed of the aircraft is less than or equal to the second threshold speed.

Optionally, the controller is configured to initiate the automatic opening of the landing gear bay door on the basis of the determination, when the determination occurs within a decision period, the decision period starting when the controller determines that the speed of the aircraft equals the first threshold speed and inhibit the automatic opening of the landing gear bay door when the determination that the one engine inoperative condition is met occurs after the decision period has elapsed.

Optionally, a duration of the decision period is determined based on one or more of: a take-off weight of the aircraft, a type of the aircraft, a configuration of the aircraft, thrust generatable by the aircraft, $V_1$ of the aircraft, lift off speed, ground speed, acceleration rate, runway topography and environmental conditions.

Optionally, the controller is configured to determine that lift-off of the aircraft has occurred.

Optionally, the controller is configured to inhibit the automatic opening of the landing gear bay door when the determination that the one engine inoperative condition is met occurs after the controller determines that the lift-off of the aircraft has occurred.

Optionally, the controller is configured such that the automatic opening of the landing gear bay door is initiated by the controller only when the controller determines that the lift-off of the aircraft has occurred.

Optionally, in the event that the controller initiates the automatic opening of the landing gear bay door, the automatic opening is initiated by the controller within a predetermined time from the controller determining that the lift-off of the aircraft has occurred.

Optionally, the predetermined time is based on a time taken for the landing gear bay door to move from the closed position to the open position after the controller initiates the automatic opening.

Optionally, the controller is configured to receive an input signal indicative of engine speed of two or more engines comprised in the aircraft and determine that the one engine inoperative condition is met based on a difference between the engine speed of the two or more engines.

Optionally, the aircraft system comprises the landing gear, the landing gear bay door, and a landing gear extension and retraction system configured to extend and retract the landing gear and open and close the landing gear bay door.

A second aspect of the present invention provides an aircraft system for an aircraft, the aircraft system comprising a controller that is configured, during a take-off procedure, to initiate, prior to receiving a command to retract a landing gear, automatic opening of a landing gear bay door associated with the landing gear from a closed position towards an open position, on the basis of a determination, made within a predetermined period, that a one engine inoperative condition is met, the predetermined period being during the take-off procedure.

Optionally, the aircraft system comprises any of the features described above with reference to the first aspect of the present invention.

A third aspect of the present invention provides a method of operating a controller of an aircraft system of an aircraft during a take-off procedure. The method comprises: the controller determining that a one engine inoperative condition is met and the controller initiating, prior to receiving a command to retract a landing gear, automatic opening of a landing gear bay door associated with the landing gear from a closed position towards an open position, on the basis of a determination, made when a speed of the aircraft is determined by the controller to be equal to or greater than a first threshold speed, that the one engine inoperative condition is met.

Optionally, the method comprises the controller initiating the automatic opening of the landing gear bay door on the basis of the determination, when the determination is made when the speed of the aircraft is determined by the controller to be less than or equal to a second threshold speed, wherein the second threshold speed is greater than $V_1$ of the aircraft and the controller inhibiting the automatic opening of the landing gear bay door when the determination that the one engine inoperative condition is made when the speed of the aircraft is greater than the second threshold speed.

Optionally, the method comprises the controller initiating the automatic opening of the landing gear bay door on the basis of the determination, when the determination is made within a decision period, the decision period starting when the controller determines that the speed of the aircraft equals the first threshold speed, and the controller inhibiting the automatic opening of the landing gear bay door when the determination that the one engine inoperative condition is made after the decision period has elapsed.

A fourth aspect of the present invention provides a non-transitory computer-readable storage medium storing instructions that, if executed by a controller of an aircraft system of an aircraft, cause the controller to carry out the method according to the third aspect of the present invention.

A fifth aspect of the present invention provides an aircraft comprising the aircraft system according to the first or second aspect of the present invention, or comprising the non-transitory computer-readable storage medium according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
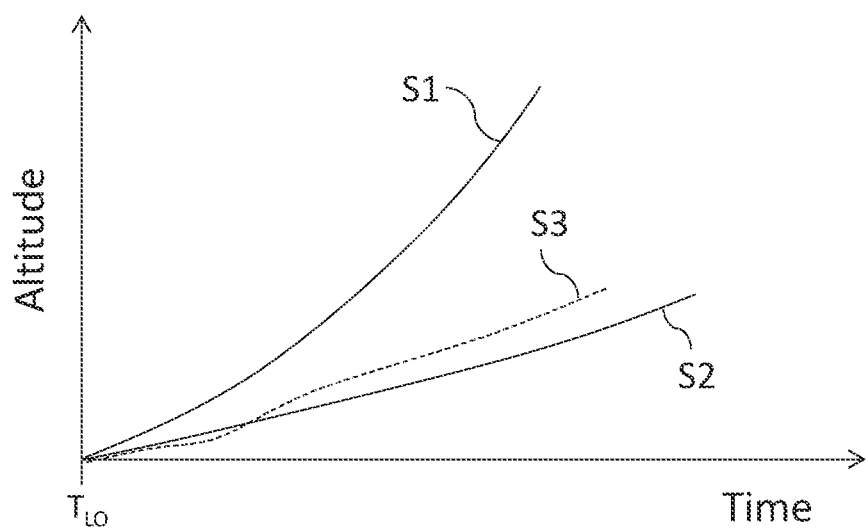
FIG. 1 shows a diagrammatic representation of aircraft trajectories during take-off procedures in different take-off scenarios.

As discussed above, in some known aircraft, the landing gear is held in an extended position when the aircraft is on the ground and is stowed at a stowed position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed and may be openable to enable movement of the landing gear between the stowed position and the extended position. Movement of the landing gear and the landing gear bay door is typically controlled by a pilot using cockpit flight controls of the aircraft, such as a landing gear control lever.

The take-off procedure is one of the highest workload flight phases for flight crew. Amongst the many actions they perform during this period is the retraction of the landing gear after lift-off. During a take-off procedure, the pilot will typically manually initiate a landing gear retraction procedure upon confirming a positive aircraft climb rate. Positive climb rate typically is confirmed by the pilot or another member of the flight crew looking through a window of the cockpit to check that the aircraft is ascending from the ground or checking an altimeter or vertical speed indicator for an increase in altitude. Such confirmation typically occurs at or before three seconds after lift-off.

The workload during a take-off procedure can be increased, if a fault or failure occurs in an engine of the aircraft (commonly referred to as a "one engine inoperative", or "OEI", situation). While the aircraft will have been designed so that the remaining engine(s) can generate sufficient thrust to get the aircraft airborne with an acceptable safety margin, there will nevertheless be a reduction in total thrust generated or generatable by the engine(s) of the aircraft, meaning that drag caused by the landing gear has a greater proportional effect on aircraft performance compared to an "all engines operative", or "AEO", situation.

Some examples discussed herein are concerned with reducing the time taken to retract a landing gear of an aircraft after lift-off in an OEI situation. In particular, some examples are concerned with determining that an OEI situation has occurred and determining whether to automatically open a landing gear bay door associated with the landing gear based on the OEI situation having occurred. Automatically opening the landing gear bay door may enable the aircraft climb rate to be increased earlier in a take-off procedure, or the aircraft to reach a given altitude sooner. This is because the landing gear is retracted sooner after receipt of a command to retract the landing gear. This and other advantages are achievable while maintaining that authority for retracting the landing gear can remain with the pilot or another member of the flight crew.

The technology discussed herein has application at least in civil aircraft, military aircraft, and unmanned aerial vehicles (UAVs). Some examples discussed herein are implementable within these areas of application when there is only one flight crew or no flight crew at all. The engine of the aircraft discussed herein could be any type of aircraft engine for generating thrust, such as a gas turbine engine, an electric motor, or a piston engine.

FIG. 1 shows a diagrammatic representation of aircraft trajectories during take-off procedures in take-off scenarios S1, S2 and S3. A take-off procedure is a procedure carried out between an aircraft starting a take-off acceleration on a runway and the aircraft reaching acceleration altitude after lift-off. In S1, the take-off procedure occurs with AEO and a landing gear bay door is opened in response to receipt, at a controller, of a command to retract an associated landing gear. In S2, the take-off procedure occurs with an OEI situation and the landing gear bay door is again opened in response to receipt of a command to retract the landing gear. In S3, the take-off procedure occurs with an OEI situation, but the landing gear bay door is opened prior to a controller receiving a command to retract the landing gear.

FIG. 1 shows that a higher aircraft climb rate is achieved in S1 compared to in S2 and S3. This is because, as discussed, less thrust is generatable in an OEI situation compared to an AEO situation. FIG. 1 also shows that opening the landing gear bay door prior to receiving a command to retract the landing gear (as in S3) can help the aircraft reach a given altitude sooner in an OEI situation compared to opening the landing gear bay door in response to receipt of the command to retract the landing gear (as in S2). This is because, in S3, upon receipt of the command at the controller to retract the landing gear, retraction of the landing gear can start sooner, since the landing gear bay door will be partially or fully open already. FIG. 1 also shows a slight reduction in aircraft climb rate in an initial climb phase in S3 compared to S2. This is due to the additional drag caused by opening the landing gear bay door at an earlier point in the take-off procedure in S3 compared to in S2. However, this is more than offset by the performance benefit of the landing gear reaching the stowed position at a comparatively earlier point in the take-off procedure, such that a greater ultimate climb rate is achieved.

Figure 2:
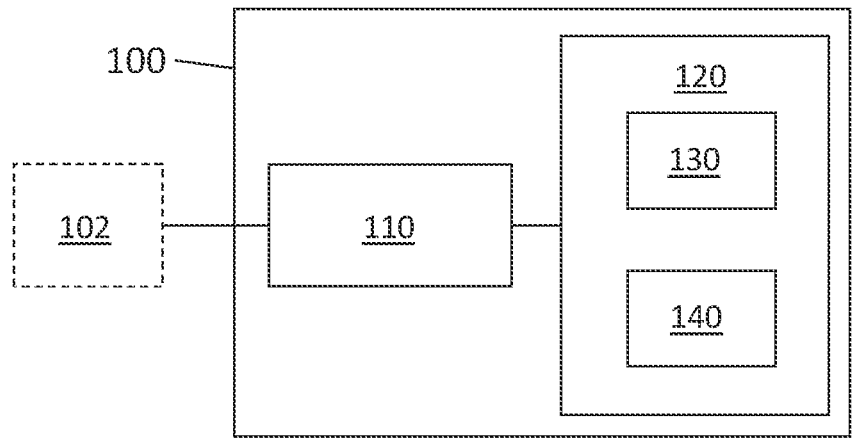
FIG. 2 shows a schematic view of an example of an aircraft system.

FIG. 2 shows a schematic view of an aircraft system 100 for an aircraft according to an example. The system 100 comprises a controller 110 and a landing gear extension and retraction system (LGERS) 120. The LGERS 120 comprises a landing gear bay door 130 and a landing gear 140. In other examples, one or more of the landing gear extension and retraction system 120, the landing gear bay door 130 and the landing gear 140 may be omitted from the aircraft system 100. That is, they may for example be comprised in one or more other systems with which the system 100 interacts. The landing gear bay door 130 is a door of a landing gear bay for accommodating the landing gear 140. The LGERS 120 is caused by the controller 110 to extend or retract the landing gear 140 following receipt, by the controller 110, of the command to do so. In the stowed position, the landing gear 140 is positioned in the landing gear bay. An opening of the landing gear bay is at least partially covered or blocked by the landing gear bay door 130 when the landing gear bay door 130 is in the closed position, and is uncovered by the landing gear bay door 130 when the landing gear bay door 130 is moved to an open position from the closed position. The degree of coverage of the opening is greater when the landing gear bay door 130 is at the closed position compared to at the open position. The landing gear extension and retraction system 120 is configured to extend and retract the landing gear 140 and to open and close the landing gear bay door 130.

Figure 3:
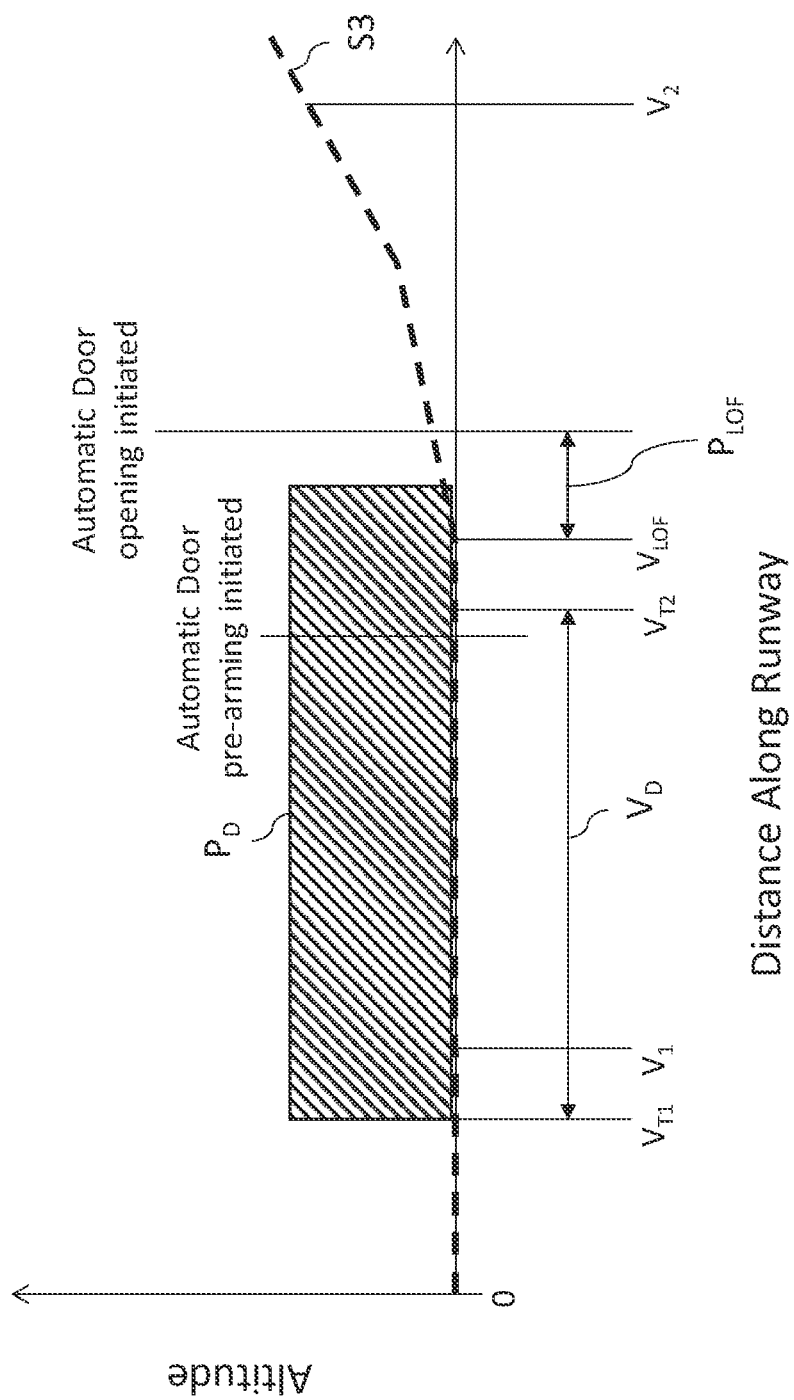
FIG. 3 shows a diagrammatic representation of an aircraft trajectory during a take-off procedure.

FIG. 3 shows a diagrammatic representation of the example aircraft trajectory in scenario S3 (as defined with reference to FIG. 1). Various speeds, as will be described in more detail below, achieved by the aircraft during scenario S3 are shown with reference to the distance along or relative to the runway (x-axis of FIG. 3) at which they occur in the take-off procedure. For example, FIG. 3 shows that $V_1$ of the aircraft (the maximum speed at which a rejected take-off can be safely initiated) is achieved whilst the aircraft is on the runway, $V_{LOF}$ of the aircraft (the lift-off speed of the aircraft) is achieved after $V_1$ of the aircraft and as lift-off occurs, and $V_2$ of the aircraft (the minimum speed to be maintained up to acceleration altitude, in the event of an OEI situation after $V_1$ of the aircraft) is achieved during an initial climb phase.

Referring to FIGS. 2 and 3, the controller 110 is configured, during a take-off procedure, to initiate, prior to receiving a command to retract the landing gear 140, automatic opening of the landing gear bay door 130 from the closed position towards the open position. In this example, pre-arming of the landing gear bay door 130 (for example, pressurising the LGERS 120 and unlocking the landing gear bay door 130) in readiness for the automatic opening of the landing gear bay door 130 is performed prior to the controller 110 initiating the automatic opening of the landing gear bay door 130, for example at the point during scenario S3 indicated in FIG. 3. The automatic opening is initiated on the basis of a determination, made when a speed of the aircraft is determined by the controller to be equal to or greater than a first threshold speed $V_{T1}$, that an OEI condition is met. The determination that an OEI condition is met may be achieved in any of the many suitable ways that will be known to the skilled person, and some example ways are discussed below. In this example, the speed of the aircraft is a ground speed but in other examples the speed of the aircraft is an air speed.

In this example, the first threshold speed $V_{T1}$ is less than $V_1$ of the aircraft. In some other examples, the first threshold speed $V_{T1}$ is equal to $V_1$ of the aircraft. In some examples, the first threshold speed $V_{T1}$ is a speed of the aircraft at a particular time before $V_1$ of the aircraft is reached, such as a speed of the aircraft one second before $V_1$ of the aircraft is reached. In some examples, when a determination that the OEI condition is met occurs before the speed of the aircraft reaches the first threshold speed $V_{T1}$, the take-off procedure is aborted.

In this example, the controller 110 is configured to initiate the automatic opening of the landing gear bay door 130 on the basis of the determination, when the determination occurs when the speed of the aircraft is determined by the controller to be less than or equal to a second threshold speed $V_{T2}$. In this example the second threshold speed $V_{T2}$ is greater than $V_1$ of the aircraft. The controller 110 is further configured to inhibit the automatic opening of the landing gear bay door 130 when the determination that the OEI condition is met occurs when the speed of the aircraft is greater than the second threshold speed $V_{T2}$.

Determination that the OEI condition is met when the speed of the aircraft is greater than $V_{T2}$ may mean that the aircraft has sufficient thrust to complete the take-off procedure without needing to automatically open the landing gear bay door 130. In an example, the second threshold speed $V_{T2}$ is less than the lift-off speed $V_{LOF}$ of the aircraft. In another example, the second threshold speed $V_{T2}$ may be equal to the lift-off speed $V_{LOF}$ of the aircraft. In yet another example, the second threshold speed $V_{T2}$ may be more than the lift-off speed $V_{LOF}$ of the aircraft.

By setting the first threshold speed $V_{T1}$ and the second threshold speed $V_{T2}$, a detection speed window $V_D$ is defined. In this example, should the determination that the OEI condition is met occur when the aircraft is at a speed within the detection speed window $V_D$, the controller 110 will initiate the automatic opening of the landing gear bay door 130 at a predetermined time during the take-off procedure (as will be discussed below). The detection speed window $V_D$ defines an aircraft speed range in which, should an OEI be determined to have occurred when the aircraft is at a speed within the defined speed range, subsequent automatic opening of the landing gear bay door 130 would help to increase the aircraft climb rate, or permit the aircraft to reach a given altitude sooner, by reducing the time to retract the landing gear. In this example, should the determination that the OEI condition is met occur when the aircraft is at a speed outside of the detection speed window $V_D$, the controller 110 will inhibit the automatic opening of the landing gear bay door 130. In this example, if the determination that the OEI condition is met is made when the aircraft speed is below the defined range, the take-off procedure is aborted, although this need not be the case in other examples. Similarly, in this example, if the determination that the OEI condition is made when the aircraft speed is above the defined range, the aircraft is considered to have sufficient thrust to complete the take-off procedure without needing to subsequently automatically open the landing gear bay door 130.

In some examples, the second threshold speed $V_{T2}$ is determined based on one or more of: a take-off weight of the aircraft, a type of the aircraft, a configuration of the aircraft, thrust generatable by the aircraft, runway topography and environmental conditions. Each of these variables may affect the acceleration rate and lift-off speed $V_{LOF}$ of the aircraft during the take-off procedure, and thus may be accounted for when setting the second threshold speed $V_{T2}$. In some examples, the aircraft system 100 is configured to receive signals indicative of one or more of the above variables from one or more separate aircraft systems 102 (of which one is shown in dashed lines in FIG. 2).

In some examples, the second threshold speed $V_{T2}$ is a speed related to $V_1$ of the aircraft. For example, the second threshold speed $V_{T2}$ is proportionally related to $V_1$ of the aircraft, such as a particular percentage greater than $V_1$ of the aircraft or a multiple of $V_1$ of the aircraft. Alternatively, the second threshold speed $V_{T2}$ may be a speed that is a fixed amount greater than $V_1$ of the aircraft, for example 10 knots greater than $V_1$ of the aircraft, irrespective of the magnitude of $V_1$ of the aircraft.

In this example, the controller 110 is configured to determine the speed of the aircraft and compare the speed of the aircraft to one or both of the first threshold speed $V_{T1}$ and the second threshold speed $V_{T2}$. In some examples, the controller 110 initiates the automatic opening of the landing gear bay door 130 based on a result of the comparison. In another example, the controller 110 is configured to receive a signal indicative of a speed of the aircraft from a separate aircraft system, such as the separate aircraft system 102 referred to above, and is configured to compare the speed of the aircraft to one or both of the first threshold speed $V_{T1}$ and the second threshold speed $V_{T2}$. In some examples, the controller 110 is configured to initiate the automatic opening of the landing gear bay door 130 based on the comparison between the speed of the aircraft and the one or both of the first threshold speed $V_{T1}$ and the second threshold speed $V_{T2}$. In another example, the controller 110 is configured to receive a signal indicative of a difference between a speed of the aircraft and one or both of the first threshold speed $V_{T1}$ and the second threshold speed $V_{T2}$ is configured to initiate the automatic opening of the landing gear bay door 130 based on the received signal.

In this example, the controller 110 is configured such that the automatic opening of the landing gear bay door 130 is initiated only when the determination that the OEI condition is met occurs when the speed of the aircraft is equal to or more than the first threshold speed $V_{T1}$ and less than or equal to the second threshold speed $V_{T2}$. That is, the automatic opening of the landing gear bay door 130 will only be initiated by the controller 110 when the determination that the OEI condition is met occurs when the speed of the aircraft is within the detection speed window $V_D$. In other examples, the controller 110 is also configured to initiate the automatic opening of the landing gear bay door in other scenarios.

FIG. 3 shows a decision period $P_D$, shown as a hatched box. The decision period $P_D$ starts when the controller determines that the speed of the aircraft equals the first threshold speed $V_{T1}$ and elapses at a predetermined time after the controller determines that the speed of the aircraft equals $V_{T1}$.

In another example of the aircraft system 100 shown in FIG. 2, the controller 110 is configured to initiate the automatic opening of the landing gear bay door 130 on the basis of the determination, when the determination occurs within the decision period $P_D$, rather than in the previously described example in which the automatic opening is initiated by the controller 110 based on the detection speed window $V_D$. In this example, the controller 110 is further configured to inhibit the automatic opening of the landing gear bay door 130 when the determination that the OEI condition is met occurs after the decision period $P_D$ has elapsed. As shown in FIG. 3, the decision period PD elapses after lift-off of the aircraft has occurred. In other examples, the decision period PD elapses before or at the point of lift-off of the aircraft. In some examples, the automatic opening of the landing gear bay door 130 will only be initiated by the controller 110 when the determination that the OEI condition is met occurs during the decision period $P_D$. In other examples, the controller 110 is also configured to initiate the automatic opening of the landing gear bay door in other scenarios.

In some examples, a duration of the decision period $P_D$ is determined based on one or more of: a take-off weight of the aircraft, a type of the aircraft, a configuration of the aircraft, thrust generatable by the aircraft, $V_1$ of the aircraft, lift off speed $V_{LOF}$ of the aircraft, ground speed, acceleration rate, runway topography and environmental conditions. Each of these variables may affect the acceleration rate of the aircraft during the take-off procedure, and thus may be accounted for when setting the decision period $P_D$. In some examples, the aircraft system 100 is configured to receive signals indicative of one or more of the above variables from a separate aircraft system, such as the separate aircraft system 102 discussed above.

In some examples the controller 110 is configured to determine that lift-off of the aircraft has occurred. In some examples, the controller 110 is further configured to inhibit the automatic opening of the landing gear bay door 130 when the determination that the OEI condition is met occurs after the controller determines that the lift-off of the aircraft has occurred. For example, the aircraft may have sufficient thrust to perform the take-off procedure without requiring the benefits associated with the system described herein, when the determination that the OEI condition is met occurs after lift-off. In some examples, in which the controller 110 initiates the automatic opening based on whether the OEI condition is determined within the speed detection window $V_D$, the second threshold speed is the speed of the aircraft at lift-off $V_{LOF}$ of the aircraft. In some examples, in which the controller 110 initiates the automatic opening based on whether the OEI condition is determined during the detection period $P_D$ and the detection period $P_D$ has not elapsed at the point of lift-off, the controller 110 is configured to inhibit the automatic opening of the landing gear bay door 130 even when the determination that the OEI condition is met occurs during a remainder of the detection period $P_D$. That is, the detection that lift-off has occurred can override the detection period $P_D$.

In some examples, the controller 110 is configured such that the automatic opening of the landing gear bay door 130 is initiated by the controller 110 only when is the controller 110 determines that the lift-off of the aircraft has occurred. This may ensure that the landing gear bay door 130 is only opened once the aircraft is in-flight. It may be beneficial to keep the landing gear bay door 130 in the closed position before lift-off to prevent, for example, debris from the runway entering, and possibly damaging, the landing gear bay.

In some examples, a determination that lift-off has occurred is based on one or more of: aircraft speed, aircraft altitude, weight on wheels, wheel speed, landing gear strut length, aircraft rotation and aircraft angle. In some examples, the controller 110 is configured to receive signals indicative of one or more of the above variables from a separate aircraft system, such as the separate aircraft system 102. In other examples, the controller 110 is configured to receive a signal indicative that lift-off has occurred.

In some examples, in the event that the controller 110 initiates the automatic opening of the landing gear bay door 130, the automatic opening is initiated by the controller 110 within a predetermined time PLOF (as shown in FIG. 3) from the controller determining that the lift-off of the aircraft has occurred. This may ensure that the landing gear bay door 130 is in the open position, or at least between the closed position and the open position, when the command to retract the landing gear 140 is received by the controller 110, such that the landing gear reaches the stowed position earlier than if the landing gear bay door 130 were in the closed position when the command to retract the landing gear 140 was received by the controller 110.

In some examples, the predetermined time PLOF is based on a time taken for the landing gear bay door 130 to move from the closed position to the open position after the controller 110 initiates the automatic opening. In some examples, the predetermined time from lift-off PLOF is based on an average time from lift-off that a command to retract the landing gear 140 is received by the controller 110. For example, the command may typically be received an average of three seconds after lift-off and the landing gear bay door 130 may take 2.5 seconds to move from the closed position to the open position, so the predetermined time from lift-off PLOF may be 0.5 seconds so that the landing gear bay door is in the open position three seconds after lift-off.

The one engine inoperative (OEI) condition can be detected in any suitable way that would be known to the skilled person. For example, the controller 110 is configured to receive an input signal indicative of engine speeds of two or more engines comprised in the aircraft and determine that the OEI condition is met based on a difference between the engine speeds of the two or more engines. In other examples, the controller 110 determines that the OEI condition is met when the difference between the engine speeds of the aircraft engines exceeds a differential threshold for a predetermined period of time.

In other examples, the controller 110 is configured to determine that the one engine inoperative condition is met based on one or more of: a signal indicative of engine oil temperature; a signal indicative of engine oil pressure; a signal indicative of engine vibration; a signal indicative of engine thrust; a signal indicative of exhaust gas temperature; a signal indicative of an engine pressure ratio; and a signal indicative of an aircraft acceleration rate during the take-off procedure.

In an example, an aircraft system for an aircraft comprises a controller, such as the controller 110 shown in FIG. 1, and the controller is configured, during the take-off procedure, to initiate, prior to receiving a command to retract a landing gear, automatic opening of a landing gear bay door associated with the landing gear from a closed position towards an open position, on the basis of a determination, made within a predetermined period, that a one engine inoperative condition is met, the predetermined period being during the take-off procedure.

In an example, the predetermined period is the decision period $P_D$ as shown in FIG. 3 and starts when a speed of the aircraft is determined by the controller 110 to be equal to the first threshold speed $V_{T1}$. In other examples, the predetermined period starts based on one or more of: the aircraft reaching a position along the runway, the aircraft reaching a speed of $V_1$ of the aircraft, and the aircraft reaching a predetermined acceleration rate. In an example, the predetermined period elapses when the controller determines that lift-off of the aircraft has occurred. In other examples, a duration of the predetermined period is based on one or more of: a take-off weight of the aircraft, a type of the aircraft, a configuration of the aircraft, a speed of the aircraft, thrust generatable by the aircraft, runway topography and environmental conditions.

Figure 4:
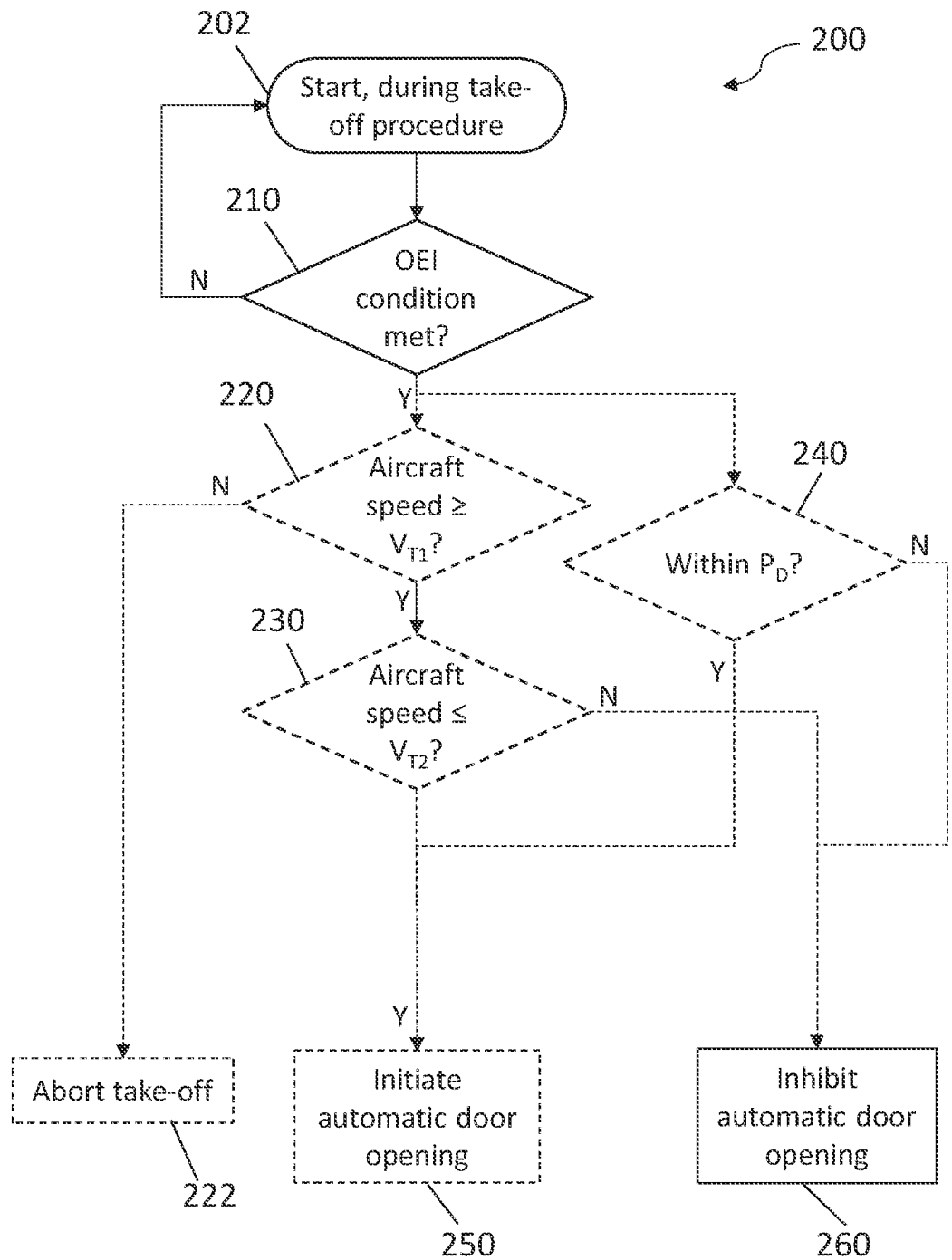
FIG. 4 shows a flow diagram showing an example of a method of operating a controller of an aircraft system of an aircraft during a take-off procedure.

There will now be described methods of operating a controller of an aircraft system of an aircraft during a take-off procedure. The aircraft system may be any aircraft system described above, such as the aircraft system 100 illustrated in FIG. 1. The controller may be the controller 110 as described in any of the examples given above. FIG. 4 shows a flow chart showing methods 200 according to various examples. In other examples, one or more parts of the illustrated method 200 may be omitted.

The method 200 starts during a take-off procedure of the aircraft (as shown in start box 202), for example at the start of an acceleration down a runway.

The method 200 comprises the controller determining that a OEI condition is met (as shown in decision box 210). In this example, when the outcome of the decision box 210 is positive, a determination is made by the controller as to whether the determination that the OEI condition is met is made when a speed of the aircraft is determined by the controller to be equal to or greater than a first threshold speed $V_{T1}$ (as shown in decision box 220). In this example, the first threshold speed $V_{T1}$ is less than $V_1$ of the aircraft. In other examples, the first threshold speed $V_{T1}$ is equal to $V_1$ of the aircraft. In this example, when the outcome of decision box 220 is negative, the take-off procedure is aborted (as shown in action box 222) and the method 200 is ended. In other examples, a different action is taken when the outcome of decision box 220 is negative.

In this example, when the outcome of decision box 220 is positive, a determination is made by the controller as to whether the determination that the OEI condition is met is made when a speed of the aircraft is determined by the controller to be less than or equal to a second threshold speed $V_{T2}$ (as shown in decision box 230). In this example, the second threshold speed is greater than the first threshold speed $V_{T1}$ and greater than $V_1$ of the aircraft. In this example, when the outcome of decision box 230 is negative, the method 200 comprises the controller inhibiting the automatic opening of the landing gear bay door (as shown in action box 260). Alternatively, when the outcome of decision box 230 is positive, the method 200 comprises the controller initiating, prior to receiving a command to retract a landing gear, automatic opening of a landing gear bay door associated with the landing gear from a closed position towards an open position (as shown in action box 250).

In an alternative example, boxes 220, 222 and 230 are omitted and, when the outcome of decision box 210 is positive, a determination is made the controller as to whether the determination that the OEI condition is met is made within a decision period $P_D$ (as shown in decision box 240). In one such example, the decision period $P_D$ starts when the controller determines that the speed of the aircraft equals the first threshold speed $V_{T1}$. In this example, when the outcome of decision box 240 is positive, the method 200 comprises the controller initiating, prior to receiving a command to retract a landing gear, automatic opening of a landing gear bay door associated with the landing gear from a closed position towards an open position (as shown in action box 250). When the outcome of decision box 240 is negative, such that the determination that the OEI condition is met is made outside of the decision period $P_D$, the method 200 comprises the controller inhibiting the automatic opening of the landing gear bay door (as shown in action box 260).

Figure 5:
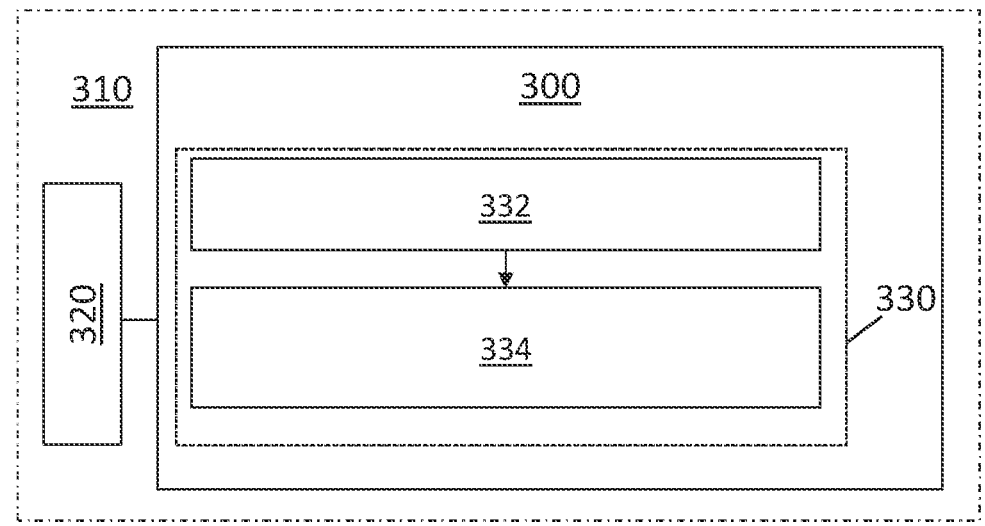
FIG. 5 shows a schematic diagram of an example of a non-transitory computer-readable storage medium.

FIG. 5 shows a schematic diagram of a non-transitory computer-readable storage medium 300 according to an example. The non-transitory computer-readable storage medium 300 stores instructions 330 that, if executed by a processor 320 of a controller 310, cause the processor 320 to perform a method according to an example. In some examples, the controller 310 is the controller 110 as described above with reference to FIG. 1 or any variation thereof discussed herein. The instructions 330 comprise: determining 332 that a OEI condition is met, and then initiating 334, prior to receiving a command to retract a landing gear, automatic opening of a landing gear bay door, on the basis of a determination, determined when a speed of the aircraft speed is equal to or greater than a first threshold speed $V_{T1}$, that a OEI condition is met. In other examples, the instructions 330 comprise instructions to perform any other example method described herein, such as one of the methods 200 described above with reference to FIG. 4.

Figure 6:
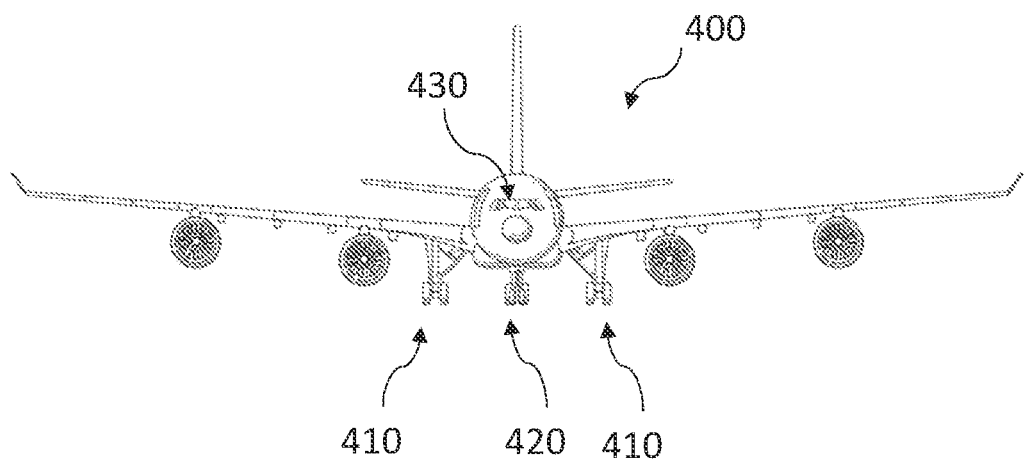
FIG. 6 shows schematic front view of an example of an aircraft.

FIG. 6 shows a schematic diagram of an aircraft 400 in accordance with an example. In this example, the aircraft 400 comprises two main landing gears 410 and a nose landing gear 420, and landing gear bay doors (now shown) each associated with a respective landing gear 410, 420. The aircraft 400 also comprises the non-transitory computer-readable storage medium 300 (not shown) discussed above with reference to FIG. 5. The aircraft 400 also comprises an aircraft system (not shown), such as an aircraft system 100 as described in any of the examples above with reference to FIG. 2. In this example, the aircraft system 100 comprises a plurality of landing gear extension and retraction systems 120, each associated with a respective landing gear 410, 420 of the aircraft 400. The aircraft 400 also has a cockpit 430 from where the command to retract the landing gear is received by a controller 110 of the aircraft system 100, as discussed above.

It is to be noted that the term "or" as used herein is to be interpreted to mean "and/or", unless expressly stated otherwise.

The above examples are to be understood as non-limiting illustrative examples of how the present invention, and aspects of the present invention, may be implemented. Further examples of the present invention are envisaged. It is to be understood that any feature described in relation to any one example may be used alone, or in combination with other features described, and may also be used in combination with one or more features of any other of the examples, or any combination of any other of the examples.

Furthermore, equivalents and modifications not described above may also be employed without departing from the scope of the present invention, which is defined in the accompanying claims.

The invention claimed is:

1. An aircraft system for an aircraft, the aircraft system comprising a controller that is configured, during a take-off procedure, to:
   initiate, prior to receiving a command to retract a landing gear, automatic opening of a landing gear bay door associated with the landing gear from a closed position towards an open position, on the basis of a determination that a one engine inoperative (OEI) condition is met, in the event that the determination that the one engine inoperative (OEI) condition is met is made by the controller when a speed of the aircraft is determined by the controller to be equal to or greater than a first threshold speed,
   wherein the controller is configured to determine that lift-off of the aircraft has occurred,
   wherein the controller is configured such that the automatic opening of the landing gear bay door is initiated by the controller only after the controller determines that the lift-off of the aircraft has occurred.

2. The aircraft system according to claim 1, wherein the first threshold speed is less than or equal to V1 of the aircraft.

3. The aircraft system according to claim 1, wherein the controller is configured to:
   initiate the automatic opening of the landing gear bay door on the basis of the determination, when the determination occurs when the speed of the aircraft is determined by the controller to be less than or equal to a second threshold speed; and
   inhibit the automatic opening of the landing gear bay door when the determination that the one engine inoperative condition is met occurs when the speed of the aircraft is greater than the second threshold speed.

4. The aircraft system according to claim 3, wherein the second threshold speed is greater than $V_1$ of the aircraft.

5. The aircraft system according to claim 3, wherein the second threshold speed is determined based on one or more of: a take-off weight of the aircraft, thrust generatable by the aircraft, runway topography and environmental conditions.

6. The aircraft system according to claim 3, wherein the second threshold speed is less than a lift-off speed of the aircraft.

7. The aircraft system according to claim 3, wherein the controller is configured such that the automatic opening of the landing gear bay door is initiated only when the determination that the one engine inoperative condition is met occurs when the speed of the aircraft is equal to or greater than the first threshold speed and also less than or equal to the second threshold speed.

8. The aircraft system according to claim 1, wherein the controller is configured to:
   initiate the automatic opening of the landing gear bay door on the basis of the determination occurring within a decision period, the decision period starting when the controller determines that the speed of the aircraft equals the first threshold speed; and
   inhibit the automatic opening of the landing gear bay door when the determination that the one engine inoperative condition is met occurs after the decision period has elapsed.

9. The aircraft system according to claim 8, wherein a duration of the decision period is determined based on one or more of: a take-off weight of the aircraft, thrust generatable by the aircraft, $V_1$ of the aircraft, lift off speed, ground speed, acceleration rate, runway topography and environmental conditions.

10. The aircraft system according to claim 1, wherein the controller is configured to inhibit the automatic opening of the landing gear bay door when the determination that the one engine inoperative condition is met occurs after the controller determines that the lift-off of the aircraft has occurred.

11. The aircraft system according to claim 1, wherein, in the event that the controller initiates the automatic opening of the landing gear bay door, the automatic opening is initiated by the controller within a predetermined time from the controller determining that the lift-off of the aircraft has occurred.

12. The aircraft system according to claim 11, wherein the predetermined time is based on a time taken for the landing gear bay door to move from the closed position to the open position after the controller initiates the automatic opening.

13. The aircraft system according to claim 12 wherein the controller is configured to:
receive an input signal indicative of engine speed of two or more engines comprised in the aircraft; and
determine that the one engine inoperative condition is met based on a difference between the engine speed of the two or more engines.

14. The aircraft system according to claim 1, comprising:
the landing gear;
the landing gear bay door; and
a landing gear extension and retraction system configured to extend and retract the landing gear and open and close the landing gear bay door;
wherein, to initiate the automatic opening of the landing gear bay door, the controller is configured to cause the landing gear extension and retraction system to open the landing gear bay door.

15. The aircraft comprising the aircraft system according to claim 1.

16. A method of operating a controller of an aircraft system of an aircraft during a take-off procedure, the method comprising:
the controller determining that a one engine inoperative condition is met; and
the controller initiating, prior to receiving a command to retract a landing gear, automatic opening of a landing gear bay door associated with the landing gear from a closed position towards an open position, on the basis of a determination that a one engine inoperative (OEI) condition is met, in the event that the determination that the one engine inoperative (OEI) condition is met is made by the controller when a speed of the aircraft is determined by the controller to be equal to or greater than a first threshold speed,
wherein the controller is configured to determine that lift-off of the aircraft has occurred,
wherein the controller is configured such that the automatic opening of the landing gear bay door is initiated by the controller only after the controller determines that the lift-off of the aircraft has occurred.

17. The method according to claim 16, comprising:
the controller initiating the automatic opening of the landing gear bay door on the basis of the determination, when the determination is made when the speed of the aircraft is determined by the controller to be less than or equal to a second threshold speed, wherein the second threshold speed is greater than $V_1$ of the aircraft; and
the controller inhibiting the automatic opening of the landing gear bay door when the determination that the one engine inoperative condition is met occurs when the speed of the aircraft is greater than the second threshold speed.

18. The method according to claim 16 comprising:
the controller initiating the automatic opening of the landing gear bay door on the basis of the determination, when the determination is made within a decision period, the decision period starting when the controller determines that the speed of the aircraft equals the first threshold speed; and
the controller inhibiting the automatic opening of the landing gear bay door when the determination that the one engine inoperative condition is met occurs after the decision period has elapsed.

19. A non-transitory computer-readable storage medium storing instructions that, when executed by the controller of the aircraft system, cause the controller to carry out the method according to claim 16.

20. An aircraft system for an aircraft, the aircraft system comprising a controller that is configured, during a take-off procedure, to:
initiate, prior to receiving a command to retract a landing gear, automatic opening of a landing gear bay door associated with the landing gear from a closed position towards an open position, on the basis of a determination that a one engine inoperative (OEI) condition is met, in the event that the determination that the one engine inoperative condition is met is made by the controller when a speed of the aircraft is determined by the controller to be equal to or greater than a first threshold speed,
wherein the controller is configured to initiate the automatic opening of the landing gear bay door only after the controller determines that lift-off of the aircraft has occurred, and
wherein the controller is configured to inhibit the automatic opening of the landing gear bay door in the event that the determination that the one engine inoperative condition is met is made by the controller after the controller determines that the lift-off of the aircraft has occurred.

* * * * *